US00RE41259E

(19) United States
(12) Reissued Patent
McHenry et al.

(10) Patent Number: US RE41,259 E
(45) Date of Reissued Patent: Apr. 27, 2010

(54) FOLDING POCKET KNIFE WITH A LOCK

(75) Inventors: William J. McHenry, Wyoming, RI (US); Jason L. Williams, Wyoming, RI (US)

(73) Assignee: Mentor Group LLC, Oregon City, OR (US)

(21) Appl. No.: 11/147,469

(22) PCT Filed: Apr. 14, 1998

(86) PCT No.: PCT/US98/07509

§ 371 (c)(1),
(2), (4) Date: Sep. 28, 2000

(87) PCT Pub. No.: WO99/52687

PCT Pub. Date: Oct. 21, 1999

Related U.S. Patent Documents

Reissue of:
(64) Patent No.: 6,574,869
Issued: Jun. 10, 2003
Appl. No.: 09/647,683
Filed: Sep. 28, 2000

U.S. Applications:
(63) Continuation-in-part of application No. 08/679,122, filed on Jul. 12, 1996, now Pat. No. 5,737,841.

(51) Int. Cl.
*B26B 1/04* (2006.01)

(52) U.S. Cl. ..... 30/161; 30/160
(58) Field of Classification Search ..... 30/153, 30/155, 160, 161; 7/118–120; 81/489
See application file for complete search history.

(56) References Cited

U.S. PATENT DOCUMENTS

| | | | | | |
|---|---|---|---|---|---|
| 1,030,058 | A | * | 6/1912 | Doles | 30/161 |
| 1,056,404 | A | * | 3/1913 | De Lorenzo | 30/161 |
| 1,189,005 | A | * | 6/1916 | Seely | 30/308.2 |
| 1,614,949 | A | * | 1/1927 | Finley | 30/161 |
| 1,667,462 | A | * | 4/1928 | Logan | 30/156 |
| 2,188,762 | A | * | 1/1940 | Schrade | 30/160 |
| 2,304,601 | A | * | 12/1942 | Schrade | 30/159 |
| 2,461,941 | A | * | 2/1949 | Sutton | 30/161 |
| 3,868,774 | A | * | 3/1975 | Miori | 30/161 |
| 4,040,181 | A | * | 8/1977 | Johnson | 30/161 |
| 4,233,737 | A | * | 11/1980 | Poehlmann | 30/335 |
| 4,240,201 | A | * | 12/1980 | Sawby et al. | 30/161 |
| 4,274,200 | A | * | 6/1981 | Coder | 30/161 |
| 4,351,126 | A | * | 9/1982 | Simonson | 43/5 |
| 4,451,982 | A | * | 6/1984 | Collins | 30/161 |
| 4,502,221 | A | * | 3/1985 | Pittman | 30/160 |
| 4,670,984 | A | * | 6/1987 | Rickard | 30/161 |
| 4,837,932 | A | * | 6/1989 | Elsener | 30/161 |
| 4,896,424 | A | * | 1/1990 | Walker | 30/349 |
| 4,974,323 | A | * | 12/1990 | Cassady | 30/155 |
| 5,044,079 | A | * | 9/1991 | Gibbs | 30/160 |
| 5,060,379 | A | * | 10/1991 | Neely | 30/161 |
| 5,095,624 | A | * | 3/1992 | Ennis | 30/161 |
| 5,111,581 | A | * | 5/1992 | Collins | 30/161 |

(Continued)

FOREIGN PATENT DOCUMENTS

| | | | |
|---|---|---|---|
| EP | 1431010 | * | 6/2004 |
| WO | PCT/US97/02185 | * | 7/1988 |
| WO | WO 98/18599 | * | 5/1998 |
| WO | WO 99/52687 | * | 10/1999 |

*Primary Examiner*—Jason Daniel Prone
(74) *Attorney, Agent, or Firm*—Hancock Hughey LLP

(57) ABSTRACT

Knives (10, 182) each include a handle (12, 184) having a blade (14, 90, 194) pivotally attached to the handle. The blade is movable between a closed position in which it is received within a groove (36, 192) of the handle and an open position. The blade has a working portion (38, 198) and a tang portion (44, 98, 204), which remains within the groove when the blade is in its open position. A locking pin (72, 208) extends transversely of the handle and blade and is movable along a pair of elongated openings (74, 216), and engages the tang portion (44, 98, 204) of the blade to lock the blade in its open position. A spring (78, 228) biases the locking pin toward the tang.

33 Claims, 10 Drawing Sheets

U.S. PATENT DOCUMENTS 5,325,588 A * 7/1994 Rogers ..... 30/161
5,384,963 A * 1/1995 Beermann ..... 30/162
5,425,175 A * 6/1995 Rogers ..... 30/161
5,461,786 A * 10/1995 Miller ..... 30/161
5,495,674 A * 3/1996 Taylor, Jr. ..... 30/160
5,615,484 A * 4/1997 Pittman ..... 30/161
5,685,079 A * 11/1997 Brothers et al. ..... 30/161
5,737,841 A * 4/1998 McHenry et al. ..... 30/161
5,915,792 A * 6/1999 Sakurai ..... 30/161
6,079,106 A * 6/2000 Vallotton ..... 30/161
6,122,829 A * 9/2000 McHenry et al. ..... 30/161
6,145,202 A * 11/2000 Onion ..... 30/160
6,434,831 B2 * 8/2002 Chen ..... 30/161
6,438,848 B1 * 8/2002 McHenry et al. ..... 30/161
6,574,869 B1 * 6/2003 McHenry et al. ..... 30/161
6,591,504 B2 * 7/2003 Onion ..... 30/160
6,684,510 B1 * 2/2004 Collins ..... 30/161
7,032,315 B1 * 4/2006 Busse ..... 30/153
7,059,053 B2 * 6/2006 Sakai ..... 30/160
7,340,837 B1 * 3/2008 Busse ..... 30/153
2005/0223562 A1 * 10/2005 Pardue et al. ..... 30/161
2005/0262701 A1 * 12/2005 Lai ..... 30/161
2007/0169351 A1 * 7/2007 Steigerwalt ..... 30/155

* cited by examiner

FOLDING POCKET KNIFE WITH A LOCK

Matter enclosed in heavy brackets [ ] appears in the original patent but forms no part of this reissue specification; matter printed in italics indicates the additions made by reissue.

This application is a 371 of PCT/US98/07509 filed Apr. 14, 1998 which is a continuation-in-part of Ser. No. 08/679,122 Jul. 12, 1996 now U.S. Pat. No. 5,737,841.

TECHNICAL FIELD

This invention relates generally to folding tools, and more particularly to a folding tool including blades or tools capable of being locked in an open position.

BACKGROUND ART

Folding knives and tools suitable for many purposes are well known in the art. For example, U.S. Pat. No. 1,030,058 to Doles, U.S. Pat. No. 1,189,005 to Seely, U.S. Pat. No. 2,188,762 to Schrade, U.S. Pat. No. 3,868,774 to Miori, U.S. Pat. No. 4,233,737 to Peohlmann, U.S. Pat. No. 4,240,201 to Sawby et al., U.S. Pat. No. 4,274,200 to Coder, U.S. Pat. No. 4,451,982 to Collins, U.S. Pat. No. 4,502,221 to Pittman, U.S. Pat. No. 4,670,984 to Rickard, U.S. Pat. No. 4,837,932 to Elsener, U.S. Pat. No. 4,896,424 to Walker, U.S. Pat. No. 5,060,379 to Neely, U.S. Pat. No. 5,425,175 to Rogers, and U.S. Pat. No. 5,461,786 to Miller are representative of the available prior art.

As disclosed in several of the aforementioned patents, there are many different mechanisms for locking tool blades in an open position. For example, the patents to Sawby et al., Miller and Seely each disclose a variation of a "lock back" mechanism. This construction entails forming a notch on a tang of the blade which is engaged by a lug located on the spine of the knife to lock the blade in an open position. A shortcoming of this type of mechanism is that excessive wear can cause the locking mechanism to fail, thereby rendering the knife unsafe for use.

The patents to Neely and Collins each disclose another type of locking mechanism. As disclosed in these patents, a blade has a tang that is engaged by a member to prevent the blade from rotating from its open position. For example, in Collins, a slidable bolt is biased towards the tang to lock the blade in its open position. A shortcoming with Collins's knife construction is that the bolt is generally parallel with the blade, and the mechanism depends on the spine of the handle for strength. Neely's knife suffers from the same disadvantage as Collins's, and from the fact that the blade may be unlocked inadvertently by pulling the blade axially away from the handle during a normal cutting motion of the knife.

What is needed, then, is a stronger lock mechanism than has previously been available for holding a blade of a folding tool in an open, or extended, position, yet which is capable of being manufactured at a reasonable cost.

DISCLOSURE OF THE INVENTION

The present invention overcomes the above-mentioned shortcomings of the prior art by providing a folding tool comprising an elongate handle defining an elongate groove therein and at least one knife or other tool blade or other tool element pivotally attached to the handle at one end. Each tool blade or element is movable, between a closed position in which it is received within the groove of the handle and an open position in which the blade or tool element is extended away from the handle and exposed. Each tool blade has a working portion that extends away from the handle when in its open position and a tang portion including a locking surface which is located within the groove of the handle when the blade is in its open position. A blade locking pin extends in a direction generally transverse to the length of the handle and blade and has its opposite ends disposed in elongate openings defined in opposite sides of the handle and aligned opposite each other. The blade locking pin is movable with respect to the handle along the elongate openings, between a first position, in which the locking pin engages a locking surface of the tang portion of blade as well as interior surfaces of the elongate openings, to lock the blade in its open position, and a second position in which the pin is spaced away from the locking surface portion of the tang to allow the blade to move from its open position. The blade locking pin is biased toward its first position, but is movable manually to its second position from its first position.

In one embodiment of the invention a locking assembly body is provided to move the locking pin manually from its first position to its second position.

In one embodiment of the invention the blade locking pin is biased toward its first position by a spring housed in a cavity defined within a side wall of the handle.

In one embodiment of the invention a spine portion of the handle is located adjacent the elongate openings in which the ends of the blade locking pin are located, and respective parts of an outer surface of the blade locking pin rest against the locking surface on the tang of the tool blade and a surface of the spine.

In one embodiment the invention provides for such locking of selected one of a plurality of tool blades or elements carried at one end of a handle.

The foregoing and other-objectives, features, and advantages of the invention will be more readily understood upon consideration of the following detailed description of the invention, taken in conjunction with the accompanying drawings.

BEST MODES FOR CARRYING OUT THE INVENTION

Figure 1:
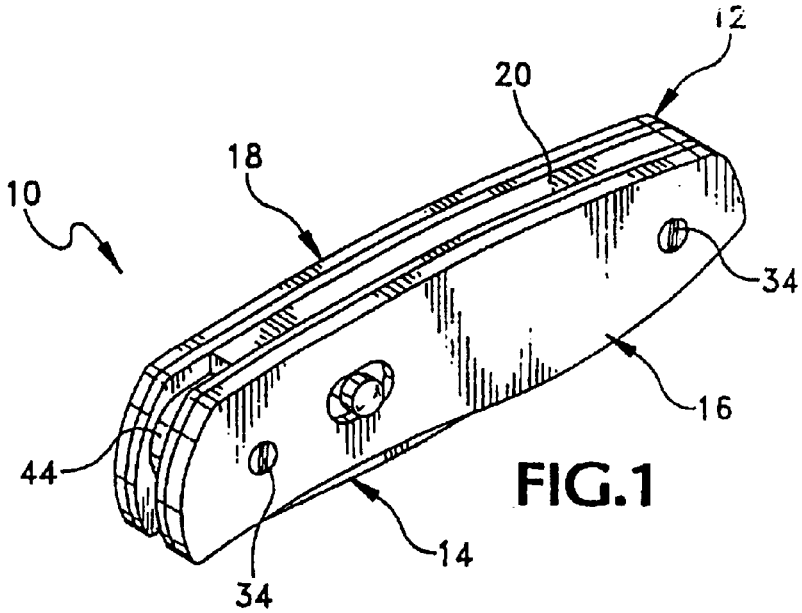
FIG. 1 is a perspective view of a folding or pocket knife embodying the present invention, a blade of the knife being shown in a closed position in which it is received within a handle of the knife.
Figure 2:
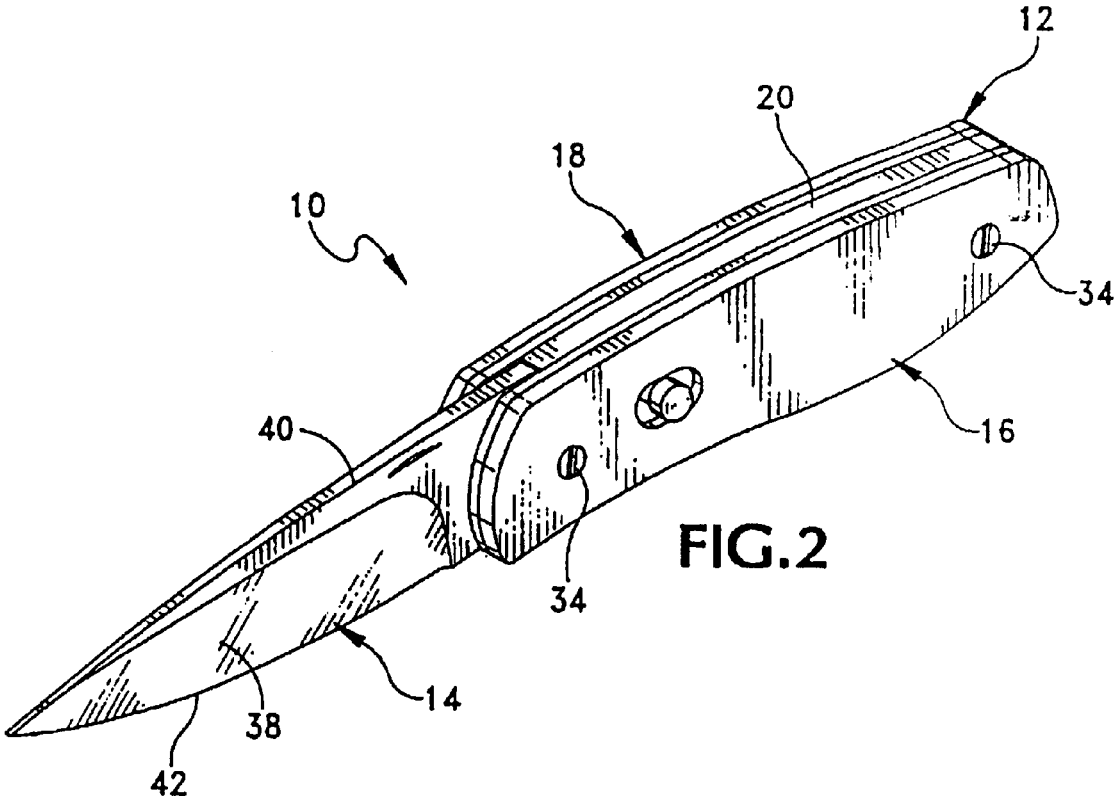
FIG. 2 is a perspective view of the knife shown in FIG. 1, with the blade of the knife shown in an open, operating position.

Referring now to the drawings, and more particularly to FIGS. 1 and 2, a folding pocket knife 10 includes a blade locking mechanism that embodies the present invention. The pocket knife 10 includes an elongate handle 12, and a blade 14 that is pivotally attached to the handle at one of its opposite ends. FIG. 1 shows the pocket knife 10 with the blade 14 in a closed position in which the blade is received within the handle 12. FIG. 2 illustrates the pocket knife 10 with the blade 14 in an open or use position. The blade 14 of the pocket knife 10 of the present invention is capable of being locked securely in that open position to prevent the inadvertent movement of the blade to its closed position, and this ability makes the knife safer to use.

Figure 3:
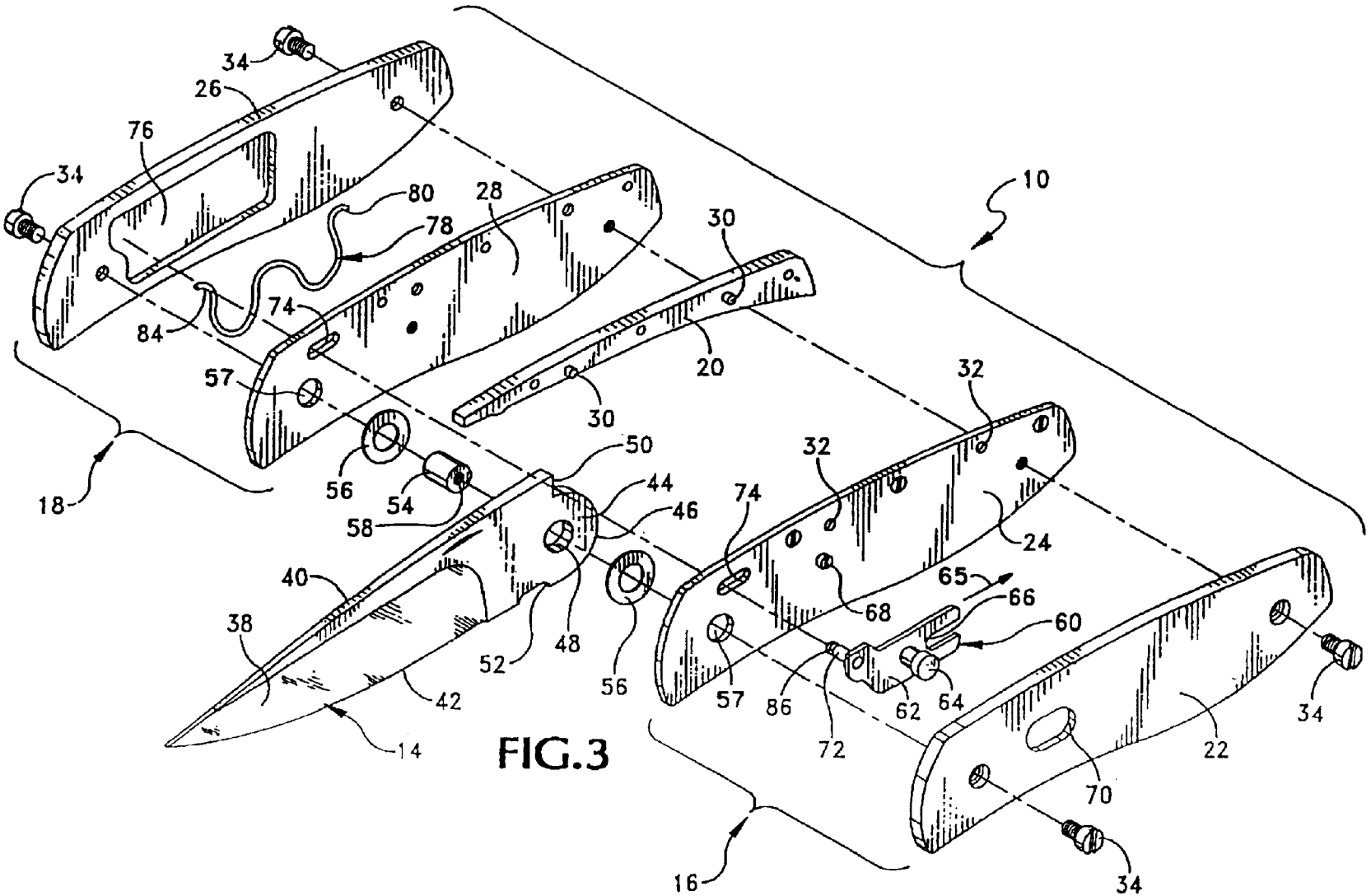
FIG. 3 is an exploded perspective view of the knife shown in FIG. 2.

Referring now to FIGS. 1–3, the handle 12 of the pocket knife 10 comprises several components, including a pair of oppositely located side wall sections, generally indicated at 16, 18, that are parallel with each other, and a spine section 20 which is located between the side wall sections along their upper long edges. As shown in FIG. 3, the side wall section 16 has an outer plate 22 and an inner liner 24, disposed inwardly alongside the outer plate 22. Similarly, the other side wall section 18 has an outer plate 26 and an inner liner 28 also disposed inwardly alongside its outer plate 26.

When the handle 12 is assembled, the spine section 20 is disposed between the liners 24, 28 of the side wall sections 16, 18, respectively, and extends along the upper edge margins of the side wall sections, outwardly projecting detents 30 provided on the spine section are received in corresponding bores 32 formed in the liners, to align the side wall sections with each other and the spine section. Suitable fasteners such as screws 34 [and 35] are used to hold together the side wall sections 16, 18 and the spine section 20. Preferably, the outer plates 22, 26 of the side wall sections 16, 18, respectively, are fabricated from a reinforced hard synthetic plastics material such as Micarta® (by Westinghouse Electric & Manufacturing Company), although other suitable materials such as metal, other plastics, wood, etc. can also be used. The liners 24, 28 of the side wall sections 16, 18, and the spine section 20, are preferably fabricated from steel or titanium since these components of the handle must be strong enough to bear the forces that might be exerted thereon when locking the blade in its open position.

The side wall sections 16, 18 and the spine section 20 define a blade receiving groove 36 (see FIG. 4) for receiving the blade 14 when it is moved to its closed position. Still referring to FIGS. 1–3, the blade 14 comprises an elongate working portion 38 having an upper blunt edge or back 40, a lower sharp edge 42, and a tang portion 44 which pivotally attaches the blade to the handle 12. The arrangement is such that the blade's working portion 38 extends away from the handle when the blade 14 is in its open position, and the tang portion 44 is located within the groove 36 when the blade is in either the open or the closed position. That is, the tang portion 44 is always located between the liners 24 and 28 of the handle 12.

More specifically, the working portion 38 is constructed in a well-known manner and is pivotally attached to the handle by the tang portion 44 so that the lower sharp edge 42 is received within the handle 12. The tang portion 44 is formed integrally with the blade portion 38 and has a semi-circularly-shaped peripheral edge 46, and a circular opening 48 is formed in the tang for attaching the blade 14 to the handle 12. One of the ends of the peripheral edge 46 of the tang portion 44 merges into an outwardly extending first shoulder 50. The other end of the peripheral edge 46 merges into an inwardly extending second shoulder 52. The first and second shoulders 50, 52 are generally perpendicular with the direction of the peripheral edge 46 at their respective junctions; however, it should be observed as in FIG. 4 that the second shoulder 52 merges into the peripheral edge 46 with a greater radius of curvature than does the first shoulder 50.

As shown in FIG. 3, an annular shaft 54 fabricated from hard steel attaches the blade 14 to the handle 12 with one of a pair of annular shims 56 on each side, between the liners 22 and 28. The shaft 54 is press-fitted into the opening 48 formed in the tang portion 44 of the blade 14 and fits rotatably but snugly through circular openings 57 defined in the liners 22 and 28 so that the shaft defines a pivot axis for the blade extending transversely with respect to the side walls 16 and 18. The annular shims 56 are received over respective ends of the shaft 54 as indicated in FIG. 3. The shaft 54 has a threaded axial bore 58 machined therethrough for matingly receiving the screw fasteners 34 which retain the outer plates 22 and 26 and keep the pocket knife 10 assembled.

Figure 4:
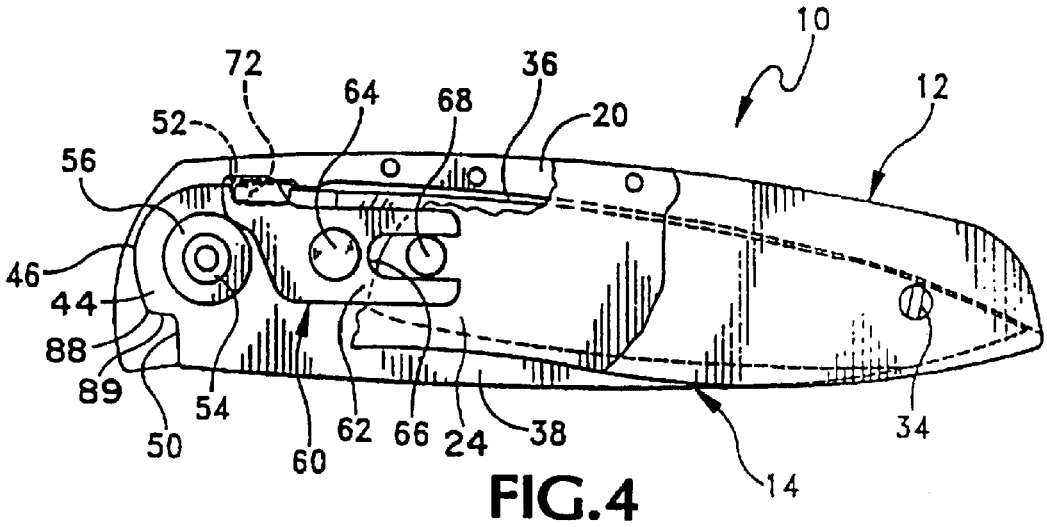
FIG. 4 is a partially cutaway elevational view from one side of the knife shown in FIGS. 1–3.
Figure 5:
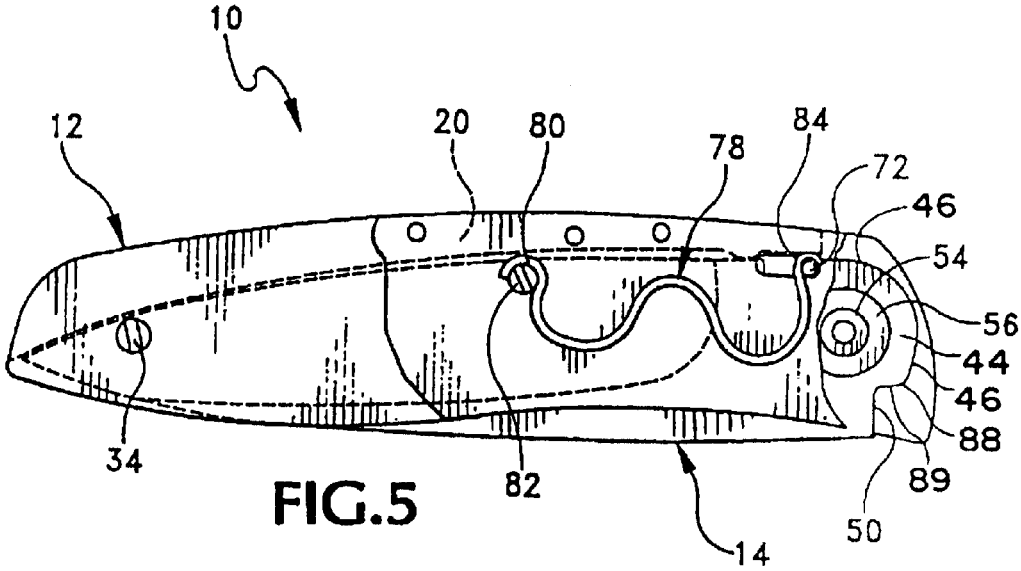
FIG. 5 is a partially cutaway elevational view from the other side of the knife shown in FIGS. 1–4.

Referring now to FIGS. 3–5, there is generally indicated at 60 a sliding lock assembly for locking the blade 14 in its open position. The sliding lock assembly 60 includes a planar sliding body member 62 which extends along a plane generally parallel with the plane of the side wall sections 16, 18 of the handle 12. Mounted on the body member 62 is an outwardly projecting latch operating arm member or knob 64 useful as a handle for slidably moving the body member 62 along an axis generally parallel with the length of the handle 12 as indicated by the arrow 65 in FIG. 3. The body member 62 is disposed between the outer plate 22 and liner 24 of the side wall section 16 in a cavity (not shown) formed in the inwardly-facing side of the outer plate 22. The body member 62 has a fork or slot 66 formed therein which receives a guide member 68 (e.g., a machine screw) suitably attached to the liner 24 to guide the movement of the sliding body member 62. The knob 64 extends outwardly through an elongated opening 70 formed through the plate 22 of the side wall section 16 so that it is accessible to the user of the pocket knife 10.

The sliding lock assembly 60 further includes a cylindrical blade locking pin 72 of which one end is attached (e.g., welded) to the body member 62. The pin 72 has a cylindrical outer surface 73, and a central axis that extends in a generally transverse direction with respect to the body member and handle 12. When the folding knife 10 is assembled, the pin 72 extends through aligned elongate openings 74 formed in the liners 24, 28 of the side wall sections 16, 18, respectively, and the free end of the pin 72 extends into a large cavity 76 formed in the inwardly facing surface of plate 26 of side wall member 18. An inwardly facing surface 77 of the spine 20 is preferably aligned with or nearly aligned with the elongate openings 74, as may be seen best in FIG. 7a. As shown in FIG. 4, the pin 72 of the sliding lock assembly 60 is located adjacent the tang portion 44 of the blade 14.

Figure 6:
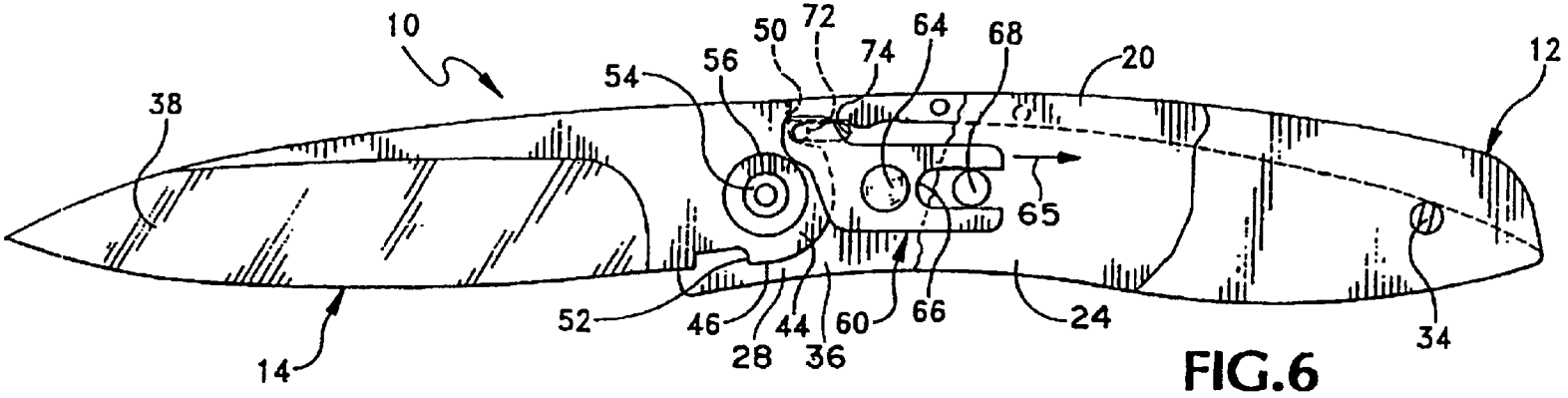
FIG. 6 is a partially cutaway elevational view of the knife from the same side as in FIG. 4, the blade being illustrated in its open position.
Figure 7:
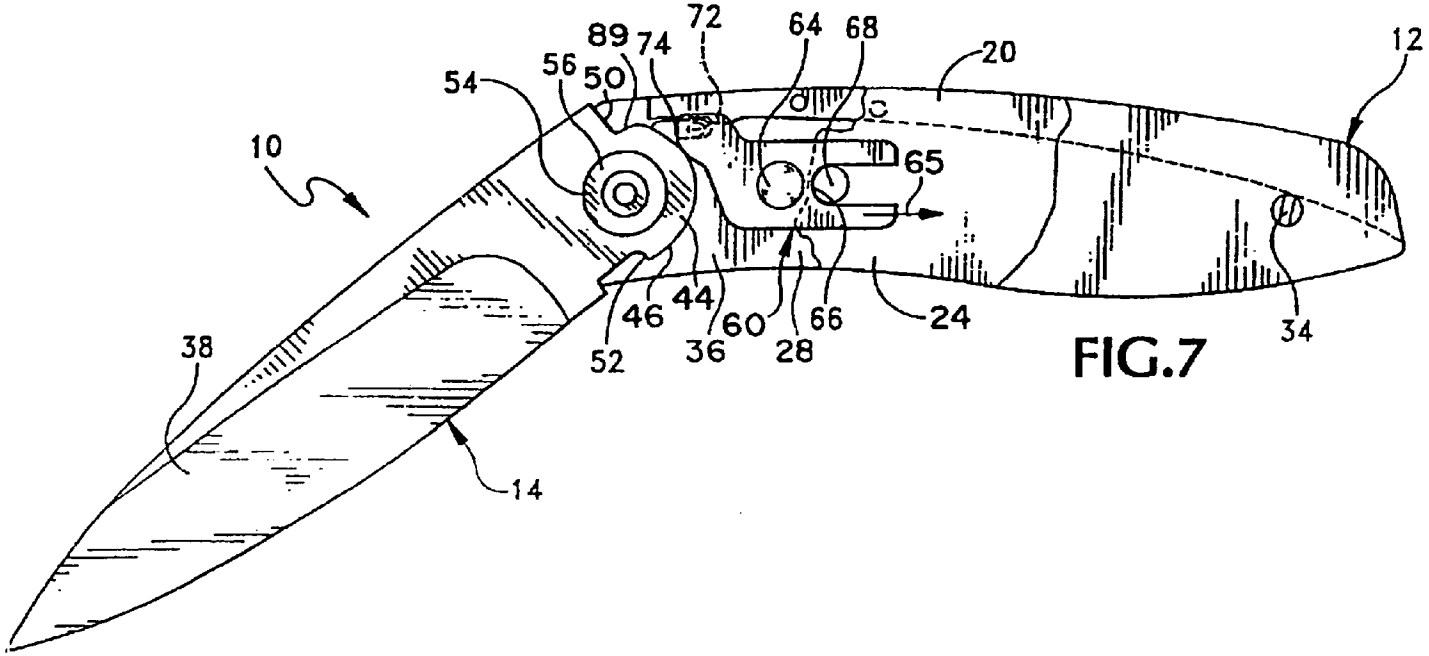
FIG. 7 is a partially cutaway elevational view of the knife, similar to FIG. 6, but with the blade of the knife moved toward its closed position.
Figures 6A, 7A:
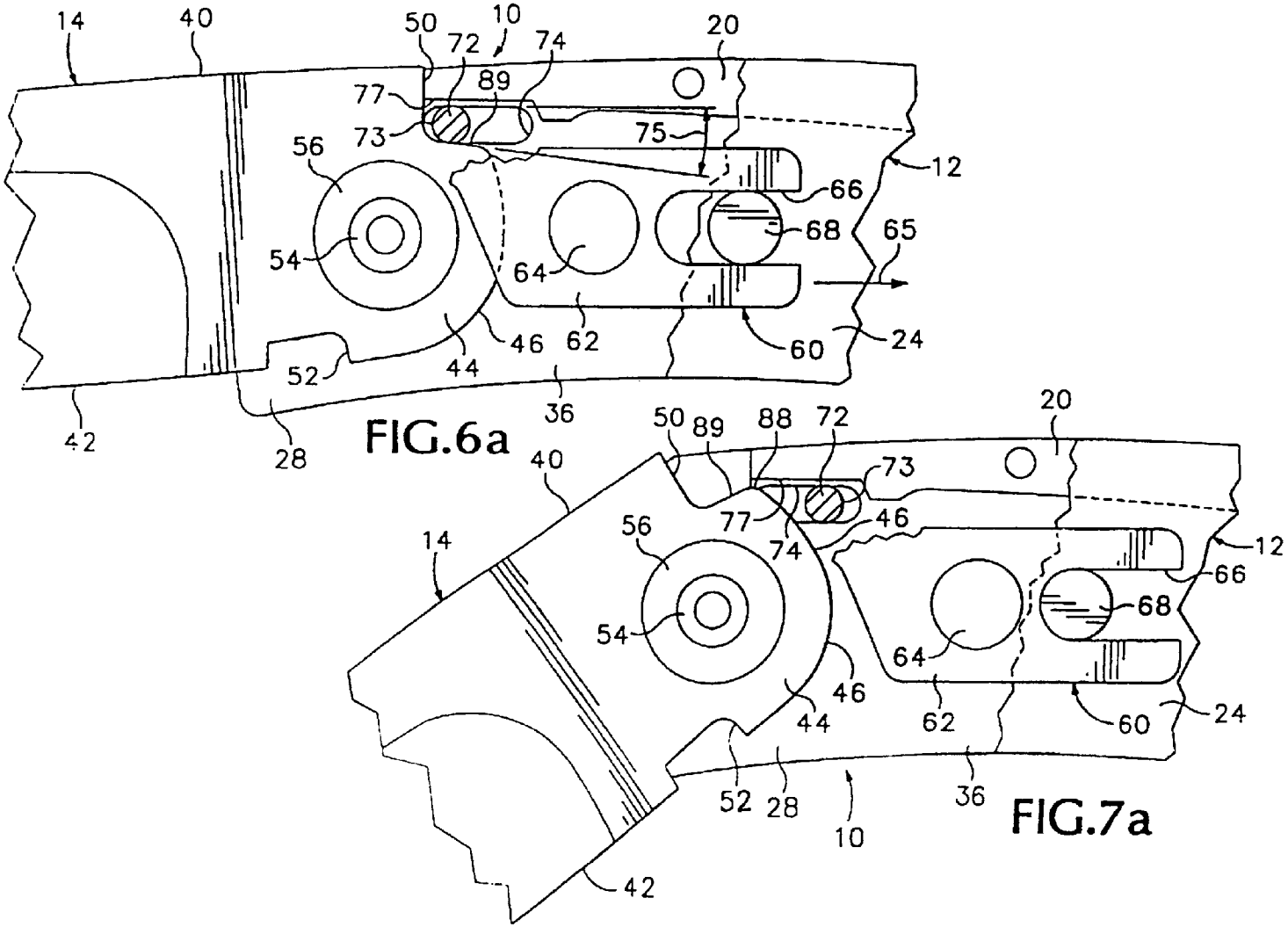
FIG. 6a is a detail view of the locking mechanism of the knife as shown in FIG. 6, at an enlarged scale.
FIG. 7a is a detail view of the locking mechanism of the knife as shown in FIG. 7, at an enlarged scale.

Turning now in FIGS. 6 and 7, the sliding lock assembly 60 is movable in a direction parallel to the length of the handle 12, as indicated by the arrow 65, between a first position shown in FIG. 6, in which the cylindrical outer surface 73 of blade locking pin 72 of the sliding lock assembly engages the tang portion 44 of the blade 14 to lock the blade in its open position, and a second position, shown in FIG. 7, in which the pin 72 is spaced away from the tang portion 44 to allow the blade to move from its open position and toward its closed position. More specifically, when the sliding lock assembly 60 is in its first position for locking the blade 14 in its open position, the pin 72 is disposed in recess defined by the tang portion 44, the first shoulder 50, and spine section 20. As may be seen best in FIG. 7a, a generally flat locking surface 89 is part of the peripheral edge 46 of the tang 44, intersecting and preferably faired into the semicircular portion through the transition 88. The locking surface 89 extends inwardly along a chord of the circle defined by the semi-circular portion of the peripheral edge 46. At angle 75, shown in FIG. 6a, is defined between the locking surface 89 of the tang 44 and the upper inner surfaces defining the elongate holes 74. The angle 75 is between 7 degrees and 14 degrees and is preferably 10 degrees, and thus is small enough that the pin 72 is not urged longitudinally away from its first position by any cam action of the locking surface portion 89 of tang 44 with sufficient force to overcome the force of the spring 78. The arrangement is such that upon an attempt to move the blade 14 from its open position, the pin 72 engages the locking surface 89 portion of the peripheral edge 46 of the tang portion 44 of the blade and interferes with the pivotal movement of the tang portion, thus preventing movement of the blade 14 about the pivot axis defined by the shaft 54.

Additionally, it should be observed that the pin 72 of the sliding lock assembly 60 has a tendency of "wearing in" rather than wearing out, since the more frequently the blade 14 is moved to its open position and locked therein by the pin, the further the pin becomes wedged between the peripheral edge 46 of the tang portion 44, the surfaces defining the elongate openings 74 in the liners 22 and 28, and (depending upon alignment) the inner surface 77 of the spine 20.

A spring 78 is provided for biasing the pin 72 of the sliding lock assembly 60 to its first position. As illustrated in FIG. 5, one end 80 of the spring 78 engages a detent 82 (e.g., a machine screw) provided on the liner 28 of the side wall section 18. The other end 84 of the spring 78 engages the free end of the pin 72. More specifically, a circumferential groove 86 is formed in the pin 72 near its free end to receive the end 84 of the spring 78 therein and ensure that the spring maintains its engagement with the pin 72. Preferably, the spring 78 is fabricated from resilient material which is strong enough for biasing the sliding lock assembly 60 to its first position, but resilient enough so that when a person applies a force on the knob 64 in a direction away from the extended blade 14, the lock assembly 60 is moved readily to its second position.

It should be observed that the peripheral edge 46 of the tang portion 44 defines a cam upon which the pin 72 can ride as the blade 14 is moved between its open and closed positions. Moreover, referring briefly to FIG. 4, when the blade 14 in its closed position the pin 72 is disposed between the peripheral edge 46 of the tang portion 44 and the second shoulder 52, and upon movement of the blade 14 away from its closed position the second shoulder moves the sliding lock assembly 60, including the pin 72, to its second position, enabling the blade 14 to open. It should also be noted that the tang portion 44 of the blade 14 can be configured so that the blade is locked in its closed position and capable of being moved only upon moving the sliding lock assembly 60 manually to its second position.

Another important feature of the tang portion of the blade 14 is that the shape of the peripheral edge 46 which defines the cam upon which the pin 72 rides can provide an "assist" when opening or closing the blade 14 of the knife 10. More specifically, as illustrated in FIGS. 5 and 6, the arrangement is such that during closing of the blade 14 of the knife 10 the pin 72 rides along the peripheral edge 46 until it rounds over the corner at the junction of the peripheral edge and the second shoulder 52. After rounding over the junction with the second shoulder the pin 72 actually assists in closing the blade 14, since the spring 78 biases the pin 72 toward the shoulder 52 and thus urges the blade 14 toward its closed position.

Turning now to FIGS. 6, 6a, 7 and 7a, when opening the blade 14, a transition at 88 in the curvature of the peripheral edge 46 also makes it possible to take advantage of the spring biased pin 72 acting on the tang portion 44 to assist in opening the blade, since the blade locking surface portion 89 of the peripheral edge 46 of the tang 44 extends at an angle inward from the arcuate portion of the peripheral edge.

Figure 8:
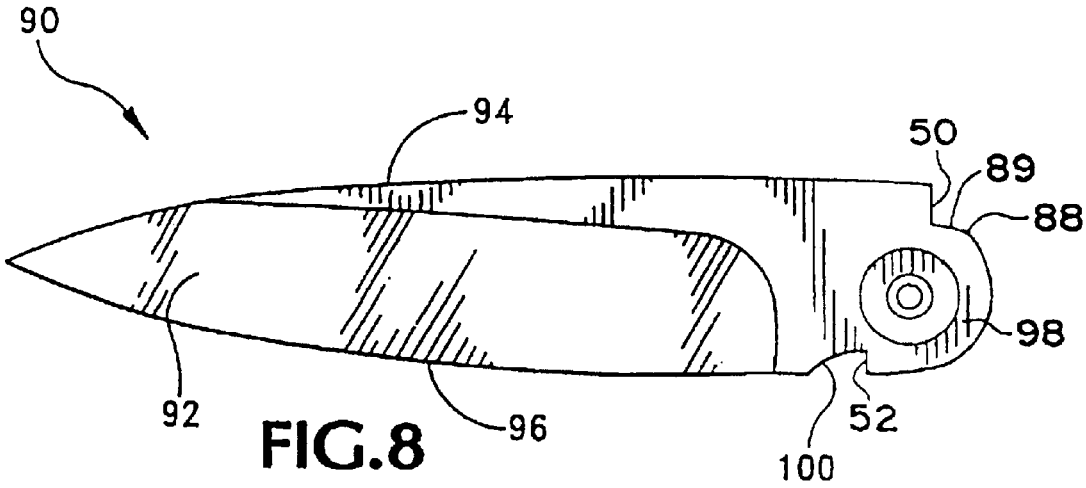
FIG. 8 is a side elevational view of a blade for incorporation in a knife that is another preferred embodiment of the invention.

FIG. 8 illustrates a blade 90 of another embodiment of the invention. The blade 90 is similar to the blade 14 in that it includes a blade portion 92 having an upper edge 94, a lower edge 96, and a tang 98 generally similar to the tang 44. However, the tang 98 also includes a ramp 100. The purpose of ramp 100 is to allow the locking assembly 60 to assist in opening of the blade 90 from its closed position. Referring briefly to FIG. 4, when the knob 64 is moved toward the second position of the lock assembly 60 (in the direction of arrow 65) the pin 72 pushes against ramp 100, causing partial opening of the knife by cam action. This is desirable so that the knife can be opened with one hand.

Figure 12:
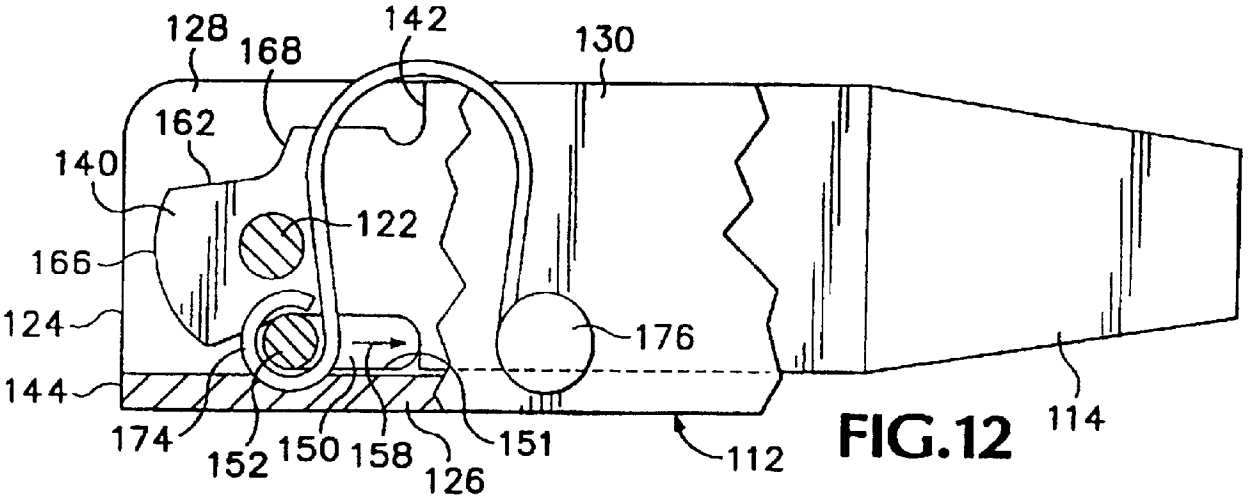
FIG. 12 is a partially cutaway elevational view of a portion of the handle and the blade and locking mechanism shown in FIGS. 9, 10 and 11 with the blade in its closed position.
Figure 14:
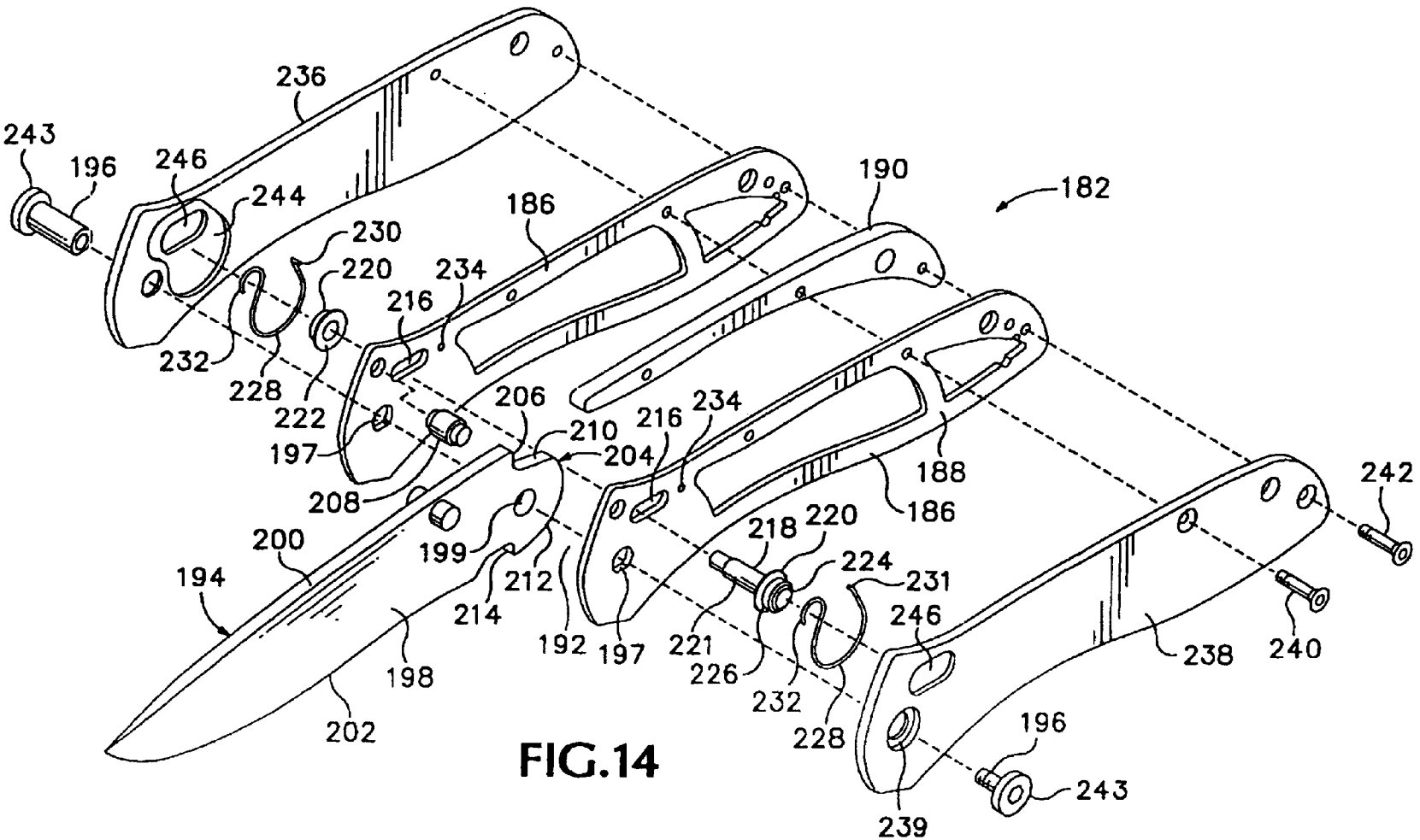
FIG. 14 is an exploded perspective view of a folding knife which is another embodiment of the present invention.

Referring now to FIGS. 9–13, a multi-bladed tool 110 which is an alternative embodiment of the present invention includes a handle 112 in the form of a generally U-shaped channel, preferably of bent sheet steel, with a plurality of tool blades 114, 116 and 118 mounted side-by-side on a blade pivot shaft 122 at one end 124 of the handle 112. Each of the blades 114, 116 and 118 may be selected individually to be moved between an extended open position such as that of the screwdriver blade 114 shown in FIGS. 9, 10 and 11, and a closed position as that of the screwdriver blade 114 as shown in FIG. 12.

The handle 112 includes a transversely extending back portion 126 having an outer margin 144, and a pair of parallel side wall portions 128 and 130 which extend parallel with each other and perpendicular to the back portion 126, thus defining a wide groove 132. The blade pivot shaft 122 is mounted securely and immovably with respect to the side walls 128 and 130, as by having each of its opposite ends 134 riveted or welded into place in a hole 136 defined in a respective one of the side walls. Each of the blades 114, 116 and 118 includes a working portion 138 such as that portion of the screwdriver blade 114 shown in FIG. 9 extending outwardly beyond the handle 112, and a tang portion 140. The tang 140 of each of the tool blades 114, 116 and 118 includes a respective bore that fits snugly but rotatably about the blade pivot shaft 132. Each tang 140 also includes an abutment shoulder 142 that rests against and is supported by the outer margin 144 of the back portion of the end 124 of the handle 112 when the respective tool blade is in the open position to establish the proper location of the blade for use.

As with the previously-described knife 10, a pair of similar elongate openings 150 are aligned with each other and extend through the side walls 128 and 130 of the handle 112. The elongate openings 150 are defined in part by flat surfaces 151 located near the back 126 of the handle 112. A blade locking pin 152, having a longitudinal axis 153, extends transversely of the handle 112 through both of the elongate openings 150, with its opposite ends located adjacent the outer sides of the two side walls 128 and 130. A respective retainer 154, 156 such as a rivet head or a small disc-shaped cap mated with the pin 152 by threads, is located on each end of the blade locking pin 152, and both retainers may be gripped conveniently as release buttons by a person using the tool 110, to move the blade locking pin 152 longitudinally, with respect to both the handle 112 and the elongate openings 150 through the side walls 128 and 130, as indicated by the arrow 158. The blade locking pin 152 includes an outer surface 160 parallel with its axis 153. For the sake of simplicity the central portion or body of blade locking pin 152, including the outer surface 160, is in the shape of a circular cylinder, but it will be appreciated that other shapes could also serve so long as the blade locking pin 152 fits snugly but slidably in the elongate openings 150.

Figures 9, 10, 13:
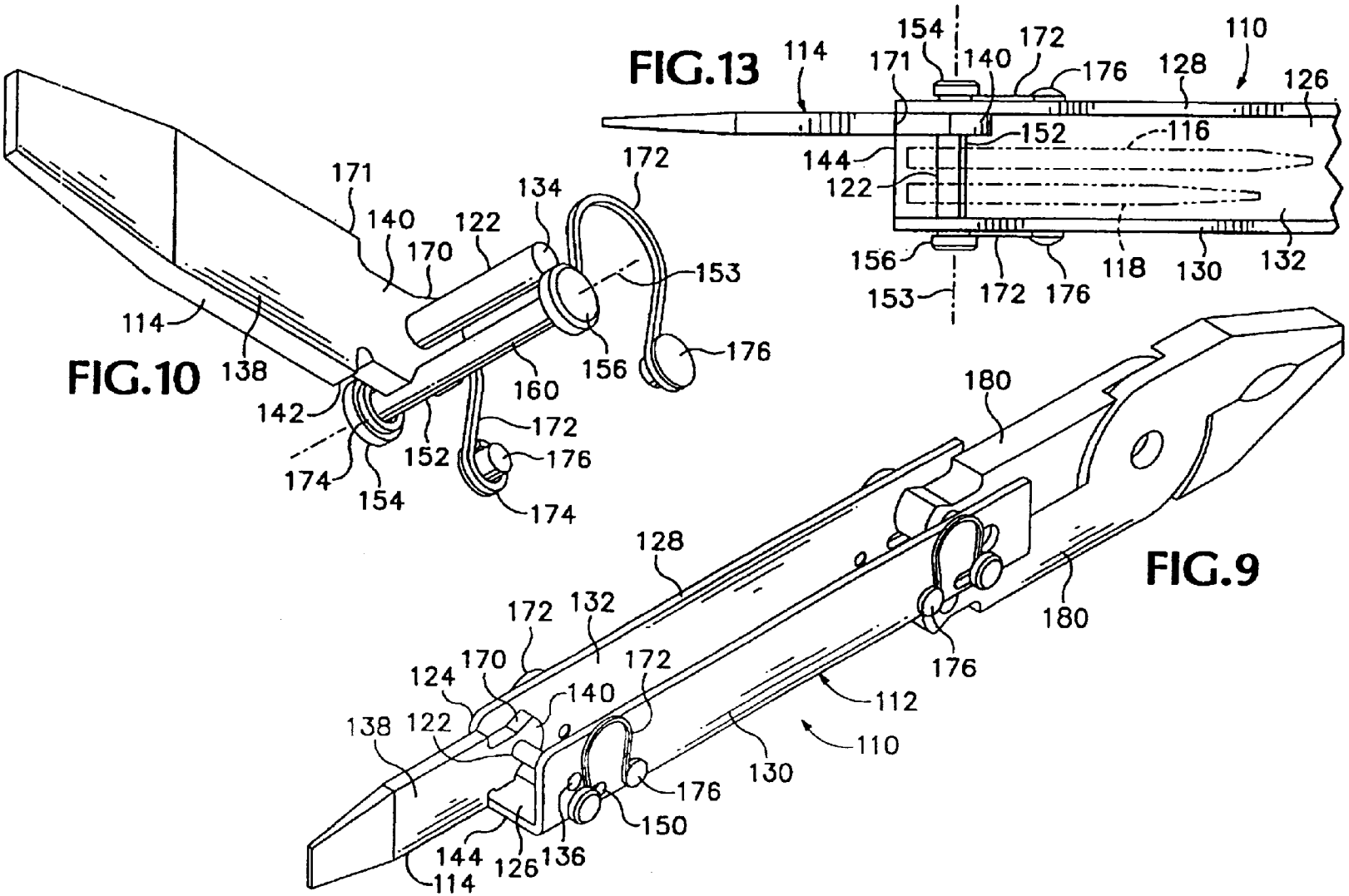
FIG. 9 is a perspective view of a tool handle, pliers jaws, and one tool blade of a multi-purpose tool incorporating a blade lock embodying the present invention.
FIG. 10 is a perspective view of a blade pivot shaft and a portion of the locking mechanism of the tool shown in FIG. 9, at an enlarged scale.
FIG. 13 is a plan view taken from the open or front, side of the tool handle shown in FIG. 9, together with several tool blades and the blade locking mechanism shown in FIGS. 9, 10, 11 and 12.
Figure 11:
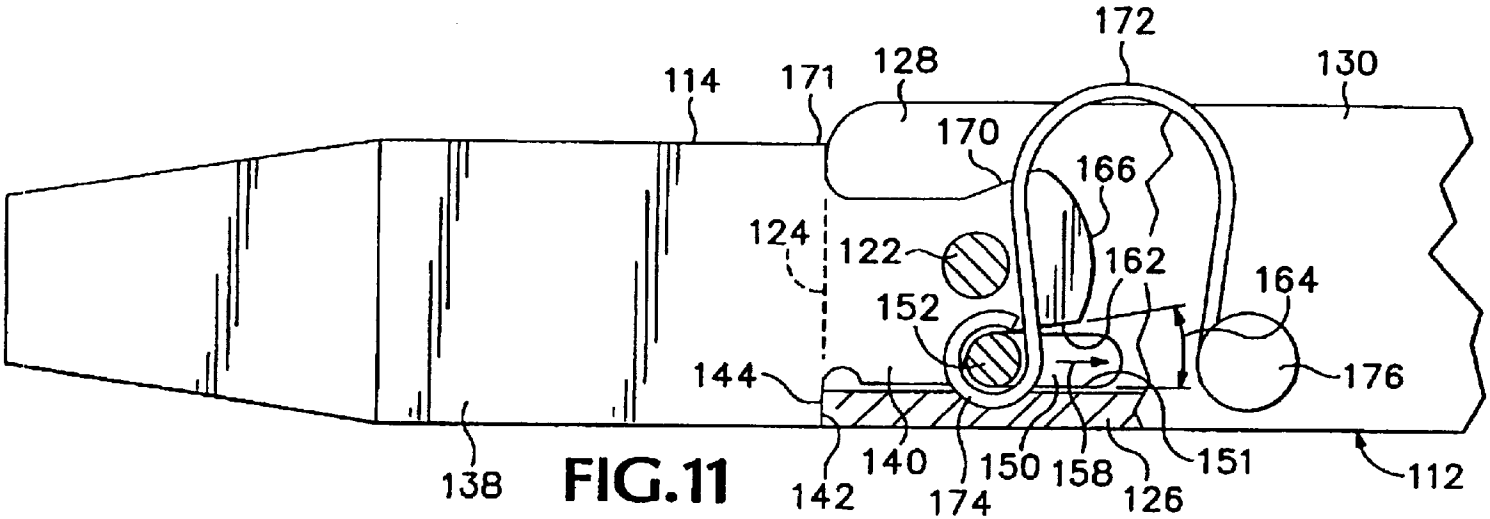
FIG. 11 is a partially cutaway elevational view of a portion of the handle and the blade and locking mechanism shown in FIGS. 9 and 10.

The tang 140 of each tool blade 114, 116 and 118 includes a locking surface 162 oriented at a small angle 164 with respect to the interior surfaces 151 defining a part of the elongate openings 150 when the respective tool blade is in its open position. As with the locking mechanism of the folding knife 10 the angle 164 should be between 7 degrees and 14 degrees and is preferably 10 degrees. The locking surface 162 is generally flat and merges into a convex arcuate peripheral edge surface 166 acting as a cam along which the outer surface 160 of blade locking pin 152 can slide during movement of a blade such as the screwdriver 114 between its open position (FIG. 9) and its closed position (FIG. 12). The blade locking pin 152 is shown in FIGS. 9 and 10 in its first position, in which its outer surface 160 engages or is very close to the locking surface 162 of the tang 140 and approaches a shoulder 168 defined on the tang 140, while the blade locking pin is supported by the interior surfaces 151 of the elongate openings 150 through the side walls 128 and 130.

On the opposite side of the tang 140 from the locking surface 162 is a closed blade retaining surface 170 which is normally engaged by the outer surface 160 of the blade locking pin 152 when the blade 114 is closed. As a mater of design choice or of production tolerances there may be a very small clearance between the outer surface 160 and the locking surface 162 or retaining surface 170 of either an open blade or a closed blade, allowing some small amount of movement. Each blade 114, 116 and 118 also includes a shoulder 171 located on the tang 140, opposite the stop 142, to rest against the inner surface of the back 126 of the handle to establish the proper closed position of the blade within the groove 132 defined between the side walls 128 and 130.

Two springs 172 are mounted, one on each side of the handle 112, to urge the blade locking pin 152 toward its first position, yet allow the blade locking pin to be retracted by the user of the tool when it is desired to move a selected one of the tool blades 114, 116 and 118 between its open and closed positions. Each spring 172 is generally oxbow-shaped with a respective loop 174 at each of its ends. Each spring 172 is attached to the respective side walls 128 or 130 of the handle by a fastener 176 such as a screw or rivet extending through the respective loop 174 into the side wall, while the loop 174 at the opposite end of each spring 172 extends around the blade locking pin 152 near the respective end thereof, between the retainer 154 or 156 and the respective side wall of the handle 112.

At the opposite end 178 of the handle 112 a tang or handle stub 180 of a pair of pliers is attached to the handle 112 in the same manner as are the blades 114, 116 and 118. The handle stub 180 has the same profile as the tang 140 and thus can similarly be locked in its extended or open position with respect to the handle 112 for use of the pliers, as shown in FIG. 9. A second handle 112 (not shown) would be similarly attached to the tang of the other pliers jaw so that the handles could be folded toward each other to enclose the pliers jaws or be extended and held in the open position of each pliers jaw by the locking mechanism, for use of the pliers.

A folding knife 182, shown in FIGS. 14–17, is a further embodiment of the present invention and includes an elongate handle 184. The handle 184 comprises a pair of liners 186, preferably of steel or titanium, which are similar to each other, each having an outer side 188. A spine 190 that may be of metal or a suitable plastic is located between the liners 186, establishing a spacing between them to define a groove 192 in which to receive a blade 194. The blade 194 is pivotally connected with one end 195 of the handle 184 by a pivot shaft 196, preferably in the form of a tubular bolt having a flat side that fits in a mating hole 197 defined in each of the liners 186 and extends rotatably through a pivot hole 199 in the blade 194. The blade 194 includes a working portion 198 having a blunt back 200 and a sharp edge 202. The blade 194 also has a tang 204 and an abutment shoulder 206 where the back 200 is interconnected with the tang 204.

A stop pin 208 extends transversely between the liners 186 and is securely interconnected with them as by fitting tightly in holes defined in the liners 186 at the same end 195 of the handle, and the abutment shoulder 206 rests snugly against the stop pin 208 when the blade 194 is in its open, extended, position for use.

The tang 204 includes a generally flat transverse locking surface 210 which is located in generally the same position as the locking surface 89 of the tang portion 44 of the knife 10 described above. The tang 204 also includes an arcuate peripheral edge 212 that can act as a cam surface as described above in connection with the tang 44, and there is a shoulder 214 adjoining and directed inwardly from the arcuate peripheral edge 212, on the side of the working portion 198 nearer the sharp edge 202.

A pair of elongate openings 216, corresponding with the elongate openings 74 of the knife 10, are defined in the liners 186 and are located opposite each other. A locking pin 218 extends through both of the elongate holes 216, thus extending transversely with respect to the elongate handle 184. The locking pin 218 has a retainer 220 at each of its ends securely fastened in place, as by being formed integrally with a generally cylindrical body portion of the locking pin 218 which has an outer surface 221, or by being mated with the body of the locking pin 218 by suitable threads or the like.

Each of the retainers 220 has a respective base surface 222 facing inwardly toward the outer side 188 of the respective one of the liners 186, with the base surfaces 222 preferably spaced within a distance of 0.003–0.008 inch from the outer sides 188. The retainers 220 extend radially outward about the body by a distance 223 of about 0.06 inch, for example, in order to keep the locking pin 218 oriented substantially perpendicular to the outer sides 188 of the liners 186. The retainers 220 preferably are shaped to include grip surfaces 224 which can easily be engaged securely by the thumb and forefinger of a person using the knife.

Each of the retainers 220 includes an annular groove 226. A pair of springs 228[, 229] are mirror opposites of each other and have a generally horseshoe-like shape, each having a laterally inwardly directed end portion 230 or 231 and a small end loop portion 232. The laterally directed end portions 230, 231 each fit into a spring-receiving hole 234 in a respective one of the liners 186, while the end loops 232 fit around the retainers 220 and are received in the grooves 226. When in place, the springs 228 are bent inwardly so that they urge the locking pin 218 toward the end of the handle 184 and thus toward the first, or locking, position of the locking pin 218 with respect to the locking surface 210 of the tang 204, in the same fashion in which the springs 172 urge the blade locking pin 152 toward its first, or locking, position with respect to the locking surface 166 of the tang 140 described above.

A pair of outer plates 236 and 238, which may be of metal or a decorative material such as wood or plastic, are held in place closely alongside the outer sides 188 of the liners 186, by fasteners such as screws 240 and 242 at the rear end of the handle 184. The outer plates 236 and 238 include countersunk shoulders 239 that are also engaged by the heads 243 of the pivot shaft 196, which hold the outer plates 236 and 238 tightly against the liners 186 at the first end 195 of the handle and also are adjusted to provide enough tension to press the liners 186 against the lateral surfaces of the tang 204 to keep the blade 194 from being too loose in the groove 192 between the liners 186.

The outer plates 236 and 238 are mirror opposites of each other, and both define respective spring cavities 244 which are also mirror opposites of each other. The spring cavities 244 provide clearance for the springs 228 to flex and move with respect to the liners 186 as the locking pin 218 moves.

Access openings 246 are defined through each of the outer plates 236 and 238 to surround the retainers 220, which are thus countersunk within the openings 246. The access openings 246 are large enough to provide for the range of motion available for the locking pin 218 in the elongate openings 216, so that the locking pin 218 can be moved against the force of the springs 228 by engaging the grip surfaces 224 with one's thumb and forefinger, to move the locking pin 218 away from its first position and permit the blade 194 to be moved from its open position toward its closed position.

Figure 15:
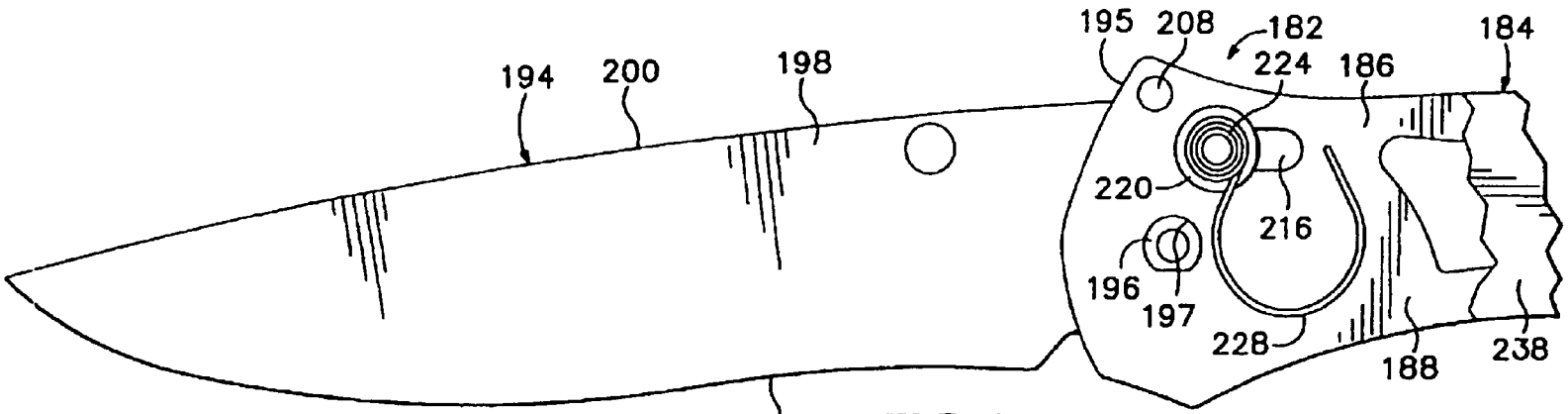
FIG. 15 is a partially cutaway side elevational view of the knife shown in FIG. 14, with its blade locked in an open position.

When the blade 194 is in its open position with the abutment shoulder resting against the stop pin 208 as shown in FIG. 15, there is an angle 248 of preferably about 10 degrees between the locking surface 210 and an interior surface 249 of the elongate holes 216 against which the locking pin 218 rests when the outer surface 221 of the locking pin 218 is resting on the locking surface 210. Thus the locking pin 218 is urged by the springs 228 into a narrow V-shaped space, to urge the blade 194 to rotate about the pivot shaft 194 to urge the abutment shoulder 206 snugly against the stop pin 208. The angle 248 is small enough so that pressure against the back 200 of the blade 194 in the open position cannot move the locking pin 218 out of engagement between the locking surface 210 and the interior surfaces 249 by cam action, and the locking pin 218 thus securely retains the blade 194 in the open position.

Figure 17:
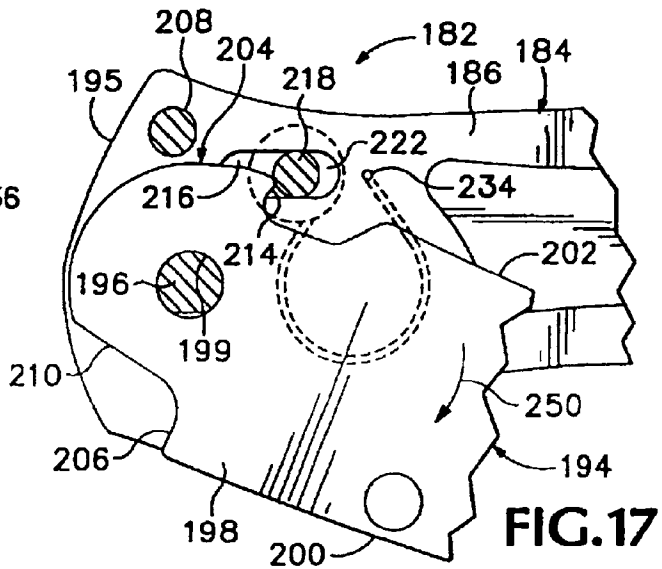
FIG. 17 is a view similar to FIG. 16 with the blade of the knife located only slightly outward from its closed position.
Figure 16:
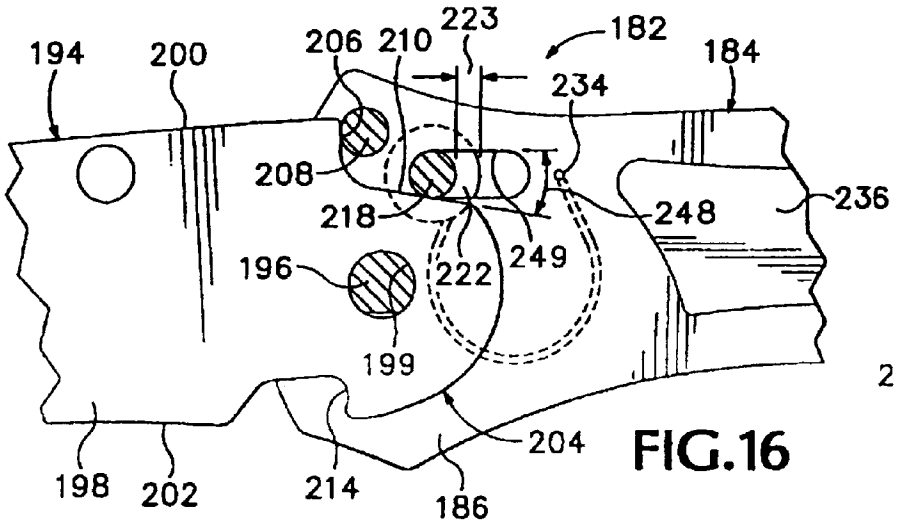
FIG. 16 is a partially cutaway side elevational view of the folding knife of FIG. 14, with its blade locked in its open position, at an enlarged scale.

As may be seen in FIG. 17, when the blade 194 is in its closed position the springs 228 urge the locking pin 218 against the shoulder 214. As the blade 194 is moved slightly from its fully closed position, the shoulder 214 of the blade 194 presses against the outer surface 221 of the locking pin 218 and moves it away from its first position. Upon further movement of the blade 194 in the same direction, indicated by the arrow 250, the locking pin 218 is carried into contact with the arcuate peripheral edge 212 or cam surface of the tang 204, which it follows until the blade 194 approaches its fully open position, at which time the springs 228 urge the locking pin 218 onto the locking surface 210 to lock the blade 194 in its open position.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A folding [tool] *knife*, comprising:

(a) a handle having a pair of opposite ends and [including] *defined by* a pair of elongate side walls spaced apart from each other and defining a blade receiving groove therebetween, each of said side walls [defining one of a pair of elongate openings located opposite each other, said handle including] *defined by* a [pair of] liner[s] and *an outer plate located outwardly alongside said liner, each of* said [elongate openings are defined by said liners and extend therethrough,] *liners having an elongate liner opening extending through said liners and located opposite each other* and *one of* said [handle further including a pair of outer plates of which one is located outwardly alongside each of said liners,] *outer plates defines an elongate outer plate opening communicating with the elongate liner opening in the adjacent liner, and* each of said outer plates defining a respective cavity adjacent [one of] said elongate *liner* openings and each of said elongate *liner* openings communicating between said groove and the respective cavity;

(b) a [tool] *knife* blade pivotally attached to said handle proximate one of said ends and movable about a blade pivot axis extending transversely with respect to said side walls, between a closed position and an open position of said blade, said blade having an elongate working portion and a tang, said elongate working portion being received within said groove when said blade is in said closed position and extending away from said handle when said blade is in said open position, and said tang being located between said side walls when said blade is in said open position;

(c) said tang having a peripheral edge including a locking surface portion thereof;

(d) a blade locking pin extending transversely with respect to said handle and having a pair of opposite end portions each extending through a respective one of said elongate *liner* openings defined in said [side walls]

*liners*, said blade locking pin having an outer surface of which a portion is located between said side walls, and said blade locking pin being movable longitudinally of said elongate *liner* openings between a first position, in which said outer surface engages said locking surface portion of said tang when said blade is in said open position and thus locks said blade in said open position, and a second position in which said locking pin is spaced away from said locking surface portion of said tang, thus allowing said blade to move from said open position; and (e) a spring disposed between said handle and said locking pin, *said spring located within said cavity defined between one of said liners and the one of said outer plates located alongside said one of said liners,* said spring urging said locking pin toward said first position along a path defined by said elongate openings in said side walls.

[2. The folding tool of claim 1 wherein said spring is located within said cavity defined between one of said liners and the one of said outer plates located alongside said one of said liners.]

3. The folding [tool] *knife* of claim 1, including a lock assembly body member fixedly attached to said locking pin, said lock assembly body member extending alongside one of said liners and being movable along said one of said liners, thereby moving said blade locking pin between said first and second positions.

[4. The folding tool of claim 1, said locking pin including a retainer located at each of said opposite end portions thereof, each said retainer extending radially outward about said locking pin and including a base surface located outwardly alongside a respective one of said liners and keeping said locking pin oriented transversely with respect to said handle.]

[5. The folding tool of claim 4, including a pair of said springs, each one of said pair having a first end interconnected with a respective one of said liners and an opposite end engaging a respective one of said retainers and thereby urging said locking pin toward said first position.]

[6. The folding tool of claim 1 wherein said handle includes a pair of outer plates of which one is located outwardly alongside each of said liners, each of said outer plates defining a respective cavity located adjacent one of said elongate openings, and each of said outer plates defining an opening therethrough aligned with said one of said elongate openings and exposing an end of said locking pin.]

[7. The folding tool of claim 6 wherein said spring is located in said cavity defined by one of said outer plates, between said one of said pair of outer plates and the one of said liners located alongside said one of said pair of outer plates.]

8. The folding [tool] *knife* of claim 1 wherein said locking pin is carried on a lock assembly body member extending longitudinally on said handle and located movably within one of said side walls.

9. The folding [tool] *knife* of claim 8, including a latch operating arm attached to said lock assembly body member and projecting outwardly through [an] *the elongate outer plate* opening defined in said one of said [side walls] *outer plates*.

10. The folding [tool] *knife* of claim 1 including a spine disposed between said side walls and including an inner surface facing toward said locking surface portion of said tang and spaced apart from said peripheral edge of said tang when said blade is in said open position.

11. The folding [tool] *knife* of claim 10 wherein said inner surface of said spine is aligned with both of said elongate *liner* openings and respective portions of said outer surface of said locking pin engage both said inner surface of said spine and said locking surface portion of said tang when said locking pin is in said first position.

12. The folding [tool] *knife* of claim 1 wherein said peripheral edge of said tang includes a ramp surface located so that said blade locking pin engages said ramp and forces said blade from said closed position toward said open position when said locking pin is moved from said first position toward said second position.

[13. The folding tool of claim 1, including a blade pivot shaft and plurality of blades all pivotally attached to said handle proximate said end thereof, each of said blades being movable separately about said blade pivot shaft and each of said blades including a tang having a respective locking surface portion.]

[14. The folding tool of claim 13 wherein said handle includes a generally U-shaped channel member including a handle back portion and a pair of parallel side walls each defining one of said elongate openings, said tool including a pair of said springs, each of said pair being attached to a respective one of said side walls and acting upon said blade locking pin proximate a respective one of said end portions thereof.]

[15. The folding tool of claim 14 wherein said locking pin has a respective retainer located at each of said opposite end portions thereof adjacent an outer face of respective one of said side walls.]

[16. The folding tool of claim 13 wherein said tang of one of said plurality of blades includes a retainer surface, said blade locking pin being located closely adjacent to said retainer surface when said one of said blades is in its closed position and said blade locking pin is in said first position, said one of said plurality of blades thereby being kept in said closed position until said blade locking pin is moved to said second position.]

17. The folding [tool] *knife* of claim 1 wherein said peripheral edge of said tang defines a cam against which said locking pin is urged by said spring as said blade is moved between said open position and said closed position.

[18. The folding tool of claim 1, including a pair of said handles and a pair of said tool blades, wherein said pair of tool blades are a pair of pliers jaws pivotally interconnected with each other.]

[19. A folding knife, comprising:

(a) a handle having a body portion defining an elongate groove located therein;

(b) a blade pivotally attached to the body portion of the handle at one end of the body portion, said blade being movable between a closed position in which the blade is received within the groove of the handle and an open position in which the blade is extended away from the handle and exposed, said blade having a working portion which extends away from the handle when the blade is in its open position and a tang portion which is substantially received within said elongate groove when the blade is in its open position, said tang portion having a peripheral edge defining a cam;

(c) a pin having a cylindrically-shaped outer surface and a long axis extending in a direction generally transverse with respect to the direction of the handle and blade, said pin being movable between a first position in which an outer surface of the pin engages the tang portion of blade for locking the blade in its open position and a second position in which the pin is spaced away from the tang portion of the blade for allowing the blade to move to its closed position, the outer surface of said pin riding upon the cam of the tang portion during movement of the blade to its open position when the pin is in its second position;

(d) a resilient member biasing the pin to its first position; and (e) means for manually moving the pin to its second position from its first position.]

[20. A tool having an elongate body, an implement, and an improved locking mechanism, wherein the body includes two opposed sidewalls and a connecting spine thereby forming a channel that is partially bounded by the sidewalls and the spine, the implement is pivotally attached to the body and the implement is movable from a first position in which it is at least partially received in the body channel and a second position in which the implement is partially rotated out of the body channel for use, and the locking mechanism can hold the implement in the second position, the improvement comprising:

(a) a slot in each of said sidewalls, each slot defining an opening through a respective sidewall to the body channel;

(b) the locking mechanism having a transverse member that extends transverse to the body, said transverse member having opposite ends extending through a respective one of said slots, said transverse member movable in said slots between an implement locking position and an implement unlocking position so that when the implement is in the second position and the transverse member is in the locking position and pressure is applied to the implement to urge it toward the first position, the transverse member wedges between the sidewalls and the implement thereby preventing the implement from moving to the first position.]

[21. The tool of claim 20, wherein each sidewall includes an outer plate and a liner, and the slots further define an opening in each liner.]

[22. The tool of claim 20 further including a bias member that urges the transverse member into the implement locking position.]

[23. The tool of claim 22, wherein the transverse member is a pin that extends into the slots of each sidewall.]

[24. The tool of claim 20, wherein the transverse member includes an implement engaging portion and a sidewall engaging portion that are of unitary construction, and when pressure applied to said implement urges the implement to move from the second position to the first position, the implement bears against the implement engaging portion and the sidewall engaging portion bears against both sidewall slots thereby hindering the implement from moving to the first position.]

25. A folding [tool] *knife*, comprising:

a handle having first and second opposed sidewalls held in a spaced-apart arrangement to define an elongate slot therebetween, at least one said sidewalls having a cavity defined therein facing said elongate slot *and each of said sidewalls comprising an outer plate and a liner alongside said outer plate, said cavity formed in an outer plate so that the cavity is located between the liner and the outer plate*;

a[n implement] *blade* having a working portion and a tang portion having a peripheral edge defining a cam and a shoulder at [the] *a* junction of the cam and the working portion, said tang portion pivotally attached to one end of the handle and said [implement] *blade* movable between a closed position in which the [implement] *blade* is at least partially received within the elongate slot and an open position in which the [implement] *blade* is extended away from the handle;

a[n implement] *blade* locking member movable between a first position in which the member engages said tang to lock said [implement] *blade* in said open position and a second position in which the member disengages said tang so that said [implement] *blade* may be moved into said closed position;

at least one resilient spring member for urging said [implement] *blade* locking member to the first position, said resilient member received in said cavity and having a first end interconnected to said [implement] *blade* locking member and a second end interconnected to a sidewall.

[26. The folding tool of claim 25 wherein both sidewalls have a cavity formed therein facing said elongate slot, and a pair of resilient spring members, one in each cavity, each having a first end interconnected to said implement locking member and a second end interconnected to a sidewall.]

27. The folding [tool] *knife* of claim 25 in which the at least one resilient spring member comprises a U-shape[d member].

28. The folding [tool] *knife* of claim 27 in which the first end of the U-shaped member [includes] *defines* a loop that interconnects with said [implement] *blade* locking member.

29. A folding [tool] *knife*, comprising:

a handle having first and second opposed sidewalls, each sidewall defined by an inner liner and an outer plate located outwardly alongside each liner, and each sidewall defining a slot, said sidewalls held in a spaced-apart arrangement to define an elongate [slot] *blade receiving groove* therebetween, and each of said outer plates defining a cavity adjacent a respective one of said [elongate openings] *slots*;

a[n implement] *blade* having a working portion and a tang portion having a peripheral edge defining a cam and a shoulder at [the] *a* junction of the cam and the working portion, said tang portion pivotally attached to one end of the handle and said [implement] *blade* movable between a closed position in which the [implement] *blade* is at least partially received within the elongate [slot] *blade receiving groove* and an open position in which the [implement] *blade* is extended away from the handle;

a[n implement] *blade* locking member extending through said slot*s* and movable between a first position in which the member engages said tang to lock said [implement] *blade* in said open position and a second position in which the member disengages said tang so that said [implement] *blade* may be moved into said closed position;

a spring located in each cavity between the outer plate and the respective inner liner, each spring having a first end interconnected to said [implement] *blade* locking member and a second end interconnected to an inner plate.

30. A folding [tool] *knife*, comprising:

a handle comprising first and second sidewalls, each sidewall defined by an inner liner and an outer plate, and each sidewall having an opening extending through said inner liner and outer plate, said sidewalls held in a spaced-apart arrangement to define a slot therebetween and each of said [sidewalls] *outer plates* having a cavity formed therein;

a[n implement] *blade* having a working portion and a tang portion, said [implement] *blade* pivotally attached to the handle and movable between an open position and a closed position;

a lock member having opposite ends extending through said openings in said sidewalls;

a substantially U-shaped spring in each cavity, each spring having a first end interconnected to said lock member and a second end interconnected to an inner plate.

31. A folding knife, comprising:

a handle having a substantially planar first sidewall, including a first inner liner and a first [t] outer plate and a first opening extending through said inner liner and outer plate, said first [sidewall] *outer plate* having a first cavity formed therein;

a blade pivotally attached to the handle and movable between an open position and a closed position;

a lock member extending through said first opening in said first sidewall in a direction transverse to said first sidewall;

a first spring in said first cavity, said first spring having a U-shape[d portion] and a first end associated with said lock member and a second end anchored to said sidewall.

32. The folding knife according to claim 31 including a second sidewall with a second opening, said second sidewall parallel to said first sidewall and defining a slot therebetween.

33. The folding knife according to claim 32 wherein said second sidewall includes a second cavity with a second spring.

34. The folding knife according to claim 33 wherein said locking member extends through said second opening in a direction transverse to said second sidewall.

35. The folding knife according to claim 31 wherein said locking member is movable in a plane parallel to the plane of the first sidewall.

[36. The folding knife according to claim 31 wherein said first spring includes an S-shaped portion.]

37. The folding knife according to claim 31 wherein said first spring is moveable in a plane parallel to the plane of the first sidewall.

38. The folding knife according to claim 31 wherein said blade has a tang portion and said locking member has a curved outer surface engaging the tang portion of the blade.

39. The folding knife according to claim 38 wherein said tang portion defines a cam and wherein said curved outer surface rides on said cam.

40. The folding knife according to claim 31 wherein said locking member extends through said first cavity.

41. The folding knife according to claim 31 wherein a portion of said first cavity is coextensive with said first opening.

42. The folding knife according to claim 41 wherein said first spring engages said locking member in a portion of said first cavity that is coextensive with said first opening.

43. A knife having an elongate body, a blade, and an improved locking mechanism, wherein the body includes two opposed sidewalls held in a spaced-apart arrangement thereby forming a channel therebetween [that is partially bounded by the sidewalls], the blade is pivotally attached to the body and is movable from a first position in which it is at least partially received in the [body] channel and a second position in which the blade is partially rotated out of the [body] channel for use, and the locking mechanism can hold the blade in the second position, the improvement comprising:

(a) the locking mechanism having a transverse member that spans the sidewalls so that the transverse member rides in elongate openings in the sidewalls so that when the blade is in the second position and urged toward said first position, said transverse member wedges between the sidewalls and the blade thereby preventing the blade from moving to the first position, wherein each sidewall comprises an inner liner and an outer plate, the elongate openings extend through said inner liner and outer plate of each sidewall, and each of said [sidewalls] *outer plates* has a recess formed therein, and a spring received in each recess, each spring having a first end associated with said transverse member and a second end anchored to a*n inner liner* [sidewall].

44. A folding knife comprising:

a handle having first and second opposed sidewalls, each sidewall defined by an inner liner and an outer plate located outwardly alongside each liner, and each sidewall defining an[d] elongate opening, said sidewalls held in a spaced-apart arrangement to define an elongate slot therebetween, and each of said outer plates defining a cavity adjacent a respective one of said elongate openings;

a blade having a tang end pivotally attached to one end of the handle and movable between a closed position in which the blade is at least partially received in the elongate slot and an open position in which the blade is extending away from the handle;

a blade locking member having opposed ends extending through said [slots] *elongate openings* and movable between a first position in which the member contacts said tang end to lock said blade in said open position and a second position in which the blade may be moved into said closed position;

a spring located in each cavity between the outer plate and the respective inner liner, each spring having a first end associated with said blade locking member and a second end associated with said [sidewall] *inner liner*.

45. A lock mechanism for a folding knife, comprising:

a handle comprising first and second sidewalls, each sidewall defined by an inner liner and an outer plate, and each sidewall having an opening extending through said inner liner and outer plate, said sidewalls held in a spaced-apart arrangement to define a slot therebetween and each of said outer plates defining a cavity formed therein adjacent said inner liners;

a blade pivotally attached to the handle and movable between an open position and a closed position;

a lock member having opposite ends extending through said openings in said sidewalls;

a spring confined in each cavity, each spring having a first end engaging said lock member and a second end anchored to said [sidewall] *inner liner*.

46. The lock mechanism according to claim 45 wherein each spring defines a U-shape[d portion].

[47. The lock mechanism according to claim 45 wherein each spring defined an S-shaped portion.]

48. A lock for a folding knife, comprising:

a handle comprising first and second sidewalls, each sidewall defined by an inner liner and an outer plate, and each sidewall having an opening extending through said inner liner and outer plate, said sidewalls held in a spaced-apart arrangement to define a slot therebetween and each of said [sidewalls] *outer plates* having a cavity formed therein;

a blade pivotally attached to the handle and movable between an open position and a closed position;

a lock member having opposite ends extending through said openings in said sidewalls so as to be exposed, and the lock member movable between a first position wherein the lock member locks the blade in the open position, and a second position wherein the lock member permits the blade to be moved to the closed position;

a wire spring in each cavity, each wire spring having a first end engaging to said lock member to urge the lock member into the first position.

49. The lock mechanism according to claim 48 wherein the lock member must be moved to the second position against the force of the wire springs to move the blade into the closed position.

50. The lock mechanism according to claim 49 wherein each spring defines a U-shape[d portion].

51. The lock mechanism according to claim 50 wherein one end of each U-shaped spring is connected to the lock member and the opposite end of each U-shaped spring is connected to an inner liner.

52. The lock mechanism according to claim 48 wherein said wire spring has a *second* fixed end and *the first end is* a movable end, said spring lies within a plane parallel to the plane of said sidewall and said movable end moves in said plane.

* * * * *